United States Patent
Ossig et al.

(10) Patent No.: US 8,064,046 B2
(45) Date of Patent: Nov. 22, 2011

(54) METHOD AND DEVICE FOR DETERMINING A DISTANCE FROM AN OBJECT

(75) Inventors: Martin Ossig, Tamm (DE); Philipp Schumann, Stuttgart (DE)

(73) Assignee: Faro Technologies, Inc., Lake Mary, FL (US)

( * ) Notice: Subject to any disclaimer, the term of this patent is extended or adjusted under 35 U.S.C. 154(b) by 31 days.

(21) Appl. No.: 12/697,837

(22) Filed: Feb. 1, 2010

(65) Prior Publication Data
US 2010/0195086 A1 Aug. 5, 2010

Related U.S. Application Data

(63) Continuation of application No. PCT/EP2009/050887, filed on Jan. 27, 2009.

(51) Int. Cl.
*G01C 3/08* (2006.01)
(52) U.S. Cl. .................................................. 356/5.01
(58) Field of Classification Search ................ 356/4.01, 356/5.01, 28
See application file for complete search history.

(56) References Cited

U.S. PATENT DOCUMENTS

| | | | | |
|---|---|---|---|---|
| 5,329,467 A | * | 7/1994 | Nagamune et al. | 702/159 |
| 6,040,898 A | * | 3/2000 | Mrosik et al. | 356/5.09 |
| 6,917,415 B2 | * | 7/2005 | Gogolla et al. | 356/5.06 |

FOREIGN PATENT DOCUMENTS

| | | | |
|---|---|---|---|
| DE | 4027990 C1 | * | 2/1992 |
| DE | 4303804 A1 | * | 8/1994 |
| DE | 19811550 A1 | * | 9/1999 |
| DE | 10361870 A1 | | 7/2005 |
| GB | 2336493 A | * | 10/1999 |

OTHER PUBLICATIONS

International Search Report for International Application No. WO2009095383 filed Jan. 27, 2009.
International Preliminary Report on Patentability for International Application No. WO2009095383 filed Jan. 27, 2009.
Written Opinion for International Application No. WO2009095383 filed Jan. 27, 2009.

* cited by examiner

*Primary Examiner* — Isam Alsomiri
(74) *Attorney, Agent, or Firm* — Cantor Colburn LLP

(57) ABSTRACT

A method for determining a distance from an object may include emitting an emission light beam from a light emitter, receiving a reception light beam at a light receiver, and determining the distance on the basis of a propagation time of the emission and reception light beams. The reception light beam may arise as a result of reflection of the emission light beam at the object. The emission light beam may be amplitude-modulated with a rectangular-waveform modulation signal. The modulation signal may have a multiplicity of rectangular pulses which occur in a multiplicity of groups. The groups may occur at varying temporal intervals with respect to one another and have changing numbers of rectangular pulses.

16 Claims, 4 Drawing Sheets ously known sinusoidal modulation signal.

METHOD AND DEVICE FOR DETERMINING A DISTANCE FROM AN OBJECT

CROSS REFERENCE TO RELATED APPLICATIONS

This is a Continuation Application of International Application No. PCT/EP2009/050887, filed on Jan. 27, 2009 priority to which is claimed under 35 U.S.C. §120. Priority under 35 U.S.C. §119(a) and 35 U.S.C. §365(b) is also claimed from German Application Nos. 10 2008 008 064.0, filed Feb. 1, 2008; and 10 2008 014 274.3, filed Mar. 3, 2008, the disclosures of which are also incorporated herein by reference.

FIELD OF INVENTION

The present application relates to methods and devices for determining a distance to an object.

BACKGROUND

A method and a device of this type are known from DE 40 27 990 C1.

At least an embodiment of the invention relates to a so-called laser scanner that is designed to measure a spatial region and/or an object three-dimensionally. Such a laser scanner is described e.g. in DE 103 61 870 A1. This known laser scanner has a measuring head that can be rotated about a vertical axis. The measuring head contains a rotor that can be rotated about a horizontal axis. The rotor emits an emission light beam and receives a reception light beam reflected from an object. (Reflection within the meaning of the present invention need not necessarily be a total reflection, but rather can also be a diffuse reflection or scattering of the emitted light beam.) The distance between the measuring head and the object is determined from the propagation time of the emission light beam and of the reception light beam. The rotation of the rotor and of the measuring head makes it possible to move the emission light beam by 360° in Azimut and by approximately 270° in elevation. In this way it is possible to measure virtually the entire space all around the known laser scanner. Typical applications for such laser scanners are the measurement of buildings (inside and/or outside), tunnels or the measurement of large objects such as ships' hulls, for instance.

The propagation time of the emission and reception light beams can be determined in various ways. In principle, a distinction is drawn between pulse propagation time methods and CW (Continuous Wave) methods. In the pulse propagation time methods, the emission light beam contains only a short emission pulse for each measuring operation. The time until the reflected pulse arrives in the receiver is measured. In the CW methods, an (at least substantially) continuous emission light beam is emitted and the propagation time is determined on the basis of a phase shift between the emission and reception light beams. In this case, the emission light beam is typically amplitude-modulated with the aid of a modulation signal and the phase shift of the modulation signal in the emitted and received light beams is used for determining the propagation time. The higher the modulation frequency, the more accurately the distance can be determined here. However the unambiguity range decreases as the modulation frequency increases; since the phase shift between emission and reception light beams is repeated after a phase cycle of 360°.

DE 40 27 990 C1 cited in the introduction therefore proposes a distance measuring device with a modulated emission light beam according to the CW method, wherein the emission light beam is amplitude-modulated with a rectangular-waveform modulation signal having a first, relatively high modulation frequency, and wherein said emission light beam is interrupted after a specific number of periods of the modulation signal for a relatively long time period. This interruption can be interpreted as amplitude modulation with a second modulation signal having a second, lower modulation frequency. In other words, the emission light beam in this case is amplitude-modulated with a first, higher and with a second, lower modulation frequency, wherein the two different modulation frequencies determine the unambiguity range. The latter is significantly larger than when just one modulation frequency is used.

In DE 43 03 804 A1 the method according to DE 40 27 990 C1 is deemed to be disadvantageous insofar as the emission light intensity averaged over the duration of the entire signal period is reduced by the amplitude modulation with the lower, second modulation frequency. This is said to lead to a reduction of the signal/noise ratio and, consequently, to have the effect that objects having a low reflectivity can no longer be measured. In order to avoid this disadvantage, DE 43 03 804 A1 proposes modulating the emission light beam alternately with the higher first and the lower, second modulation frequency, that is to say that in each time interval the emission light beam is modulated with only one of the two modulation frequencies in each case. However, this method results in lengthened measuring times since each object has to be measured twice. The higher measuring time is disadvantageous particularly in the case of a laser scanner, because the emission light beam can then only be pivoted relatively slowly.

SUMMARY OF THE INVENTION

Against this background, in at least an embodiment of the present invention, the available light power is optimally utilized to obtain a large signal/noise ratio, which furthermore affords high measuring accuracies together with a large unambiguity range.

According to at least an embodiment of the invention, this object is achieved by means of a method and a device of the type mentioned in the introduction wherein the groups of rectangular pulses occur at varying temporal intervals with respect to one another and have changing numbers of rectangular pulses.

The novel method and the novel device are furthermore based on the principle of propagation time measurement according to the CW method, that is to say that the propagation time is determined on the basis of a phase shift of the modulation signal in the reception light beam relative to the modulation signal in the emission light beam. Furthermore, the novel method and the novel device use a rectangular-waveform modulation signal with which the emission light beam is amplitude-modulated. Though DE 40 27 990 C1 cited in the introduction has already considered a rectangular-waveform modulation signal for the amplitude modulation of a emission light beam, sinusoidal modulation signals are usually used in practice, by contrast. A rectangular-waveform modulation signal has the advantage over a sinusoidal modulation signal that the modulation signal remains at its respective maximum value for longer given the same signal amplitude (pulse peak) and the same modulation frequency. In other words, less light power is "wasted" for the edge rise in the case of a rectangular-waveform modulation signal. Consequently, the use of a rectangular-waveform modulation signal enables a higher signal/noise ratio than the use of a comparable sinusoidal modulation signal. The available light power can be utilized significantly better with a rectangular-waveform modulation signal.

In contrast to the method according to DE 40 27 990 C1, the emission light beam modulated with a rectangular waveform according to the novel method is not only suppressed periodically, however, the modulation signal itself is modulated in a manner such that the rectangular pulses occur at temporally varying intervals with respect to one another and with changing numbers of pulses.

In a particularly preferred exemplary embodiment, the modulation signal is a binary rectangular signal (in the manner of a digital 0-1 sequence), wherein the individual rectangular pulses occur with the varying mark-space ratio and varying pulse clustering. In other exemplary embodiments, the rectangular pulses can be pulse peaks of a non-binary rectangular-waveform modulation signal, e.g. the pulse peaks of a quaternary rectangular-waveform signal. In a preferred exemplary embodiment, the rectangular pulses of the modulation signal are distributed in such a way that the modulation signal itself is frequency-modulated, to be precise preferably according to a periodically recurring pattern.

It should be pointed out in this connection that a rectangular signal can never have an exactly rectangular waveform in reality, since unavoidable bandwidth limitations and overshoots in real circuits always lead to a deviation from the ideal rectangle. It generally holds true, however, that the luminous efficiency in the method and the device of at least an embodiment of the present invention is all the better, the closer the modulation signal comes to an ideal rectangular signal.

According to the novel method and the novel device, the amplitude of the emission light beam is modulated with a modulation signal which comprises a multiplicity of different modulation frequencies on account of its own changing properties. This multiplicity of different modulation frequencies includes not just the harmonic multiples that every rectangular-waveform signal comprises per se on account of the Fourier relationship. Over and above the harmonic multiples of a rectangular signal the novel modulation signal comprises a multiplicity of different modulation frequencies which, in particular, are lower than the first harmonic of the rectangular-waveform signal. Consequently, the novel modulation signal is a combined modulation signal with which the light emitter can be driven continuously. The different modulation frequencies contained in the novel modulation signal are preferably evaluated at least approximately simultaneously, such that in principle one measuring operation suffices for each distance measurement. On account of the high modulation frequencies contained in the combined modulation signal, the distance can be determined with high measuring accuracy. On the other hand, the modulation signal also contains lower modulation frequencies on account of the varying pulse groups, further, such that a large unambiguity range is obtained.

Furthermore, it has been found that the available light power can be utilized significantly better with the novel modulation signal than with comparable combined sinusoidal signals. The object mentioned above is therefore fully achieved.

In at least an embodiment of the invention, the temporal intervals change periodically.

In this configuration, the temporal intervals between the groups of rectangular pulses become longer and shorter according to a periodically repeating pattern. The periodically varying temporal intervals lead to a modulation frequency in the rectangular-waveform modulation signal which is low in comparison with the fundamental frequency of the rectangular-waveform modulation signal. The low modulation frequency enables a large unambiguity range. Furthermore, this configuration, on account of the "pauses" between the pulse groups, enables a higher peak loading of the light emitter given the same average light power, which results in a further improvement of the signal/noise ratio.

In a further configuration, the number of rectangular pulses per group changes periodically.

This configuration provides for a further "low" modulation frequency in the combined modulation signal and it can consequently contribute to a further enlargement of the unambiguity range. The combination of this configuration with the preceding configuration is particularly advantageous, wherein the periodically changing intervals and the periodically changing number of rectangular pulses per group occur with the same period. In this case, the larger temporal intervals between groups of rectangular pulses result from the smaller number of rectangular pulses per group. This configuration simplifies the practical realization and it enables a very good utilization of the available light power.

In a further configuration, the modulation signal is generated by addition of a first rectangular-waveform modulation signal having a first modulation frequency and a second rectangular-waveform modulation signal having a second modulation frequency, wherein the first modulation frequency is large relative to the second modulation frequency. Preferably, the first modulation frequency is at least five times greater than the second modulation frequency.

This configuration enables a very simple and cost-effective generation of the novel modulation signal and hence a simple and cost-effective realization of the novel device. Moreover, an addition of the first and second modulation signals reduces the number of unrequired "secondary frequencies" in the modulation signal in comparison with a multiplication, which is likewise conceivable in principle. Consequently, the available light power is concentrated on the useable and used modulation frequencies to a greater extent.

In a further configuration, a third rectangular-waveform modulation signal having a third modulation frequency is added to the first and second rectangular-waveform modulation signals, wherein the second and third modulation frequencies differ from one another, and wherein the first modulation frequency is also large relative to the third modulation frequency. It is particularly advantageous if the second and third modulation frequencies are approximately identical or close together.

In this configuration, the difference between the second and third modulation frequencies is significantly less than the difference between the second and first modulation frequencies or the difference between the third and first modulation frequencies. In a preferred exemplary embodiment, the first modulation frequency is approximately 125 MHz, the second modulation frequency is approximately 15 MHz and the third modulation frequency is approximately 13 MHz.

This configuration has the advantage that a third modulation frequency is available for signal evaluation, whereby the unambiguity range can be enlarged further. It is particularly advantageous if the second and third modulation frequencies are relatively close to one another, as in the preferred exemplary embodiment, because in such case a beat arises whose frequency corresponds to the difference between the second and third modulation frequencies. This difference is very small in comparison with the actual frequencies of the modulation signals. Consequently, the unambiguity range can be enlarged to a very great extent without the low beat frequency having to be made available separately. The choice and tuning of the individual circuit components of the novel device can be significantly simplified in this configuration.

In a further configuration, the second and third modulation signals have identical pulse amplitudes.

This configuration simplifies the signal evaluation and leads to a further improved luminous efficiency. It is particularly advantageous if the second and third modulation frequencies are so close to one another that a beat frequency is available for signal evaluation.

In a further configuration, the first modulation signal has a larger pulse amplitude than the second modulation signal. In a particularly preferred exemplary embodiment, the pulse amplitude of the first modulation signal is larger approximately by a factor of 2 than the pulse amplitudes of the second or third modulation signal, wherein the latter are identical.

This configuration contributes to enlarging the temporal intervals between the groups of rectangular pulses in the combined modulation signal, which at first sight results in a reduction of the average transmission power of the emission light beam. The pulse or peak power with which the light emitter is operated is advantageously increased in this case, however. This is possible without destruction of the light emitter by virtue of the larger intervals between the groups of rectangular pulses and contributes to again increasing the signal/noise ratio in the useful signal.

In a further configuration, all the rectangular pulses of the modulation signal have an at least substantially identical pulse amplitude.

In this configuration, the combined modulation signal is a binary signal such as is usually used for the representation of a 0-1 sequence in field of digital technology. As an alternative, the combined modulation signal could be a rectangular-waveform signal having a multiplicity (n>2) of pulse amplitude values. The preferred configuration has the advantage that the combined modulation signal can be generated very simply and efficiently with the aid of digital circuits, wherein the modulation signals to be combined and the combined modulation signal are in this case provided digitally as 0-1 sequences. Furthermore, the maximum amplitude of the emission light beam can be utilized with each pulse which likewise contributes to an optimum utilization of the available light power.

In a further configuration, the rectangular-waveform modulation signal is generated as a binary rectangular-waveform modulation signal with the aid of a digital circuit.

As already indicated above, this configuration enables a very simple and cost-effective realization of the novel method and of the novel device. Furthermore, the combined modulation signal in this configuration can be varied very flexibly and be adapted to different environments and/or measuring tasks.

As an alternative to this, in other configurations, the rectangular-waveform modulation signal is generated from at least two sinusoidal signals having a different frequency, wherein the sinusoidal signals are in each case amplified and amplitude-limited.

In this configuration, the rectangular-waveform modulation signal is generated with the aid of analog circuit technology. This configuration enables a very simple and cost-effective realization of the novel device using circuit components which have hitherto been operated with sinusoidal signals. In particular, the novel method in this configuration can be integrated very easily into existing circuit concepts according to the prior art.

In a further configuration, the propagation time of the emission and reception light beams is determined on the basis of a phase difference of the modulation signal in the emission light beam and in the reception light beam, wherein there is measurement of the phase angle of the modulation signal in the emission light beam at the light emitter.

In this configuration—which is also intrinsically inventive—the phase angle of the modulation signal in the emission light beam is determined metrologically and this phase is used as a reference for determining the propagation time. In other words, here the phase angle instantaneously present in the emission light beam is used for determining the propagation time. It is particularly preferred in this case if the light emitter comprises a laser diode and if the phase angle of the control current that flows through the laser diode is measured. The phase angle of the control current can be determined in a simple manner and it represents the actual instantaneous phase angle of the modulation signal in the emission light beam with high accuracy. This configuration enables a very high measuring accuracy because a phase drift in the region of the light emitter is eliminated from the distance determination.

It goes without saying that the features mentioned above and those yet to be explained below can be used not only in the combination respectively specified, but also in other combinations or by themselves, without departing from the scope of the present invention.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION OF THE PREFERRED EMBODIMENTS

Figure 1:
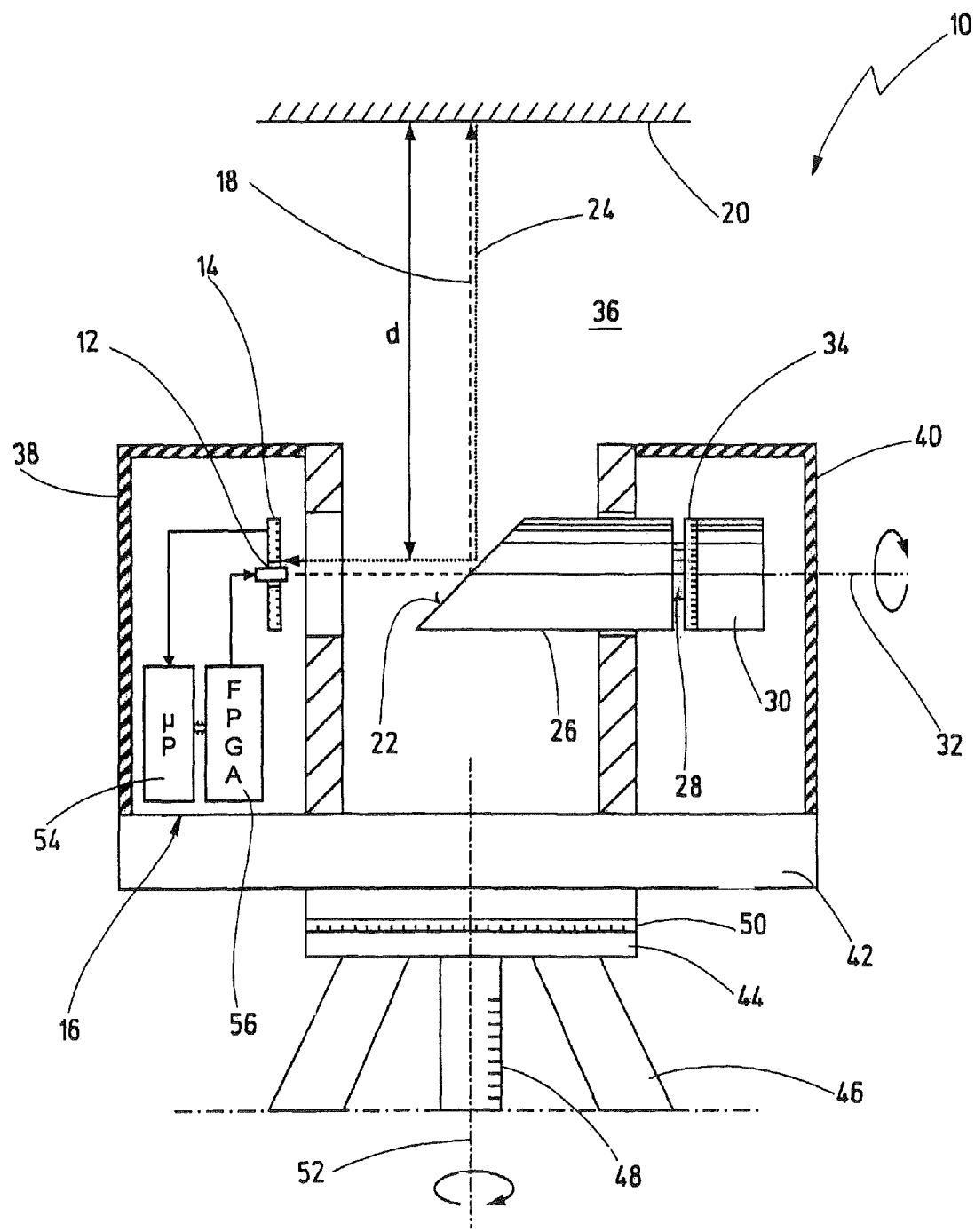
FIG. 1 shows a laser scanner in accordance with an embodiment of the invention.

In FIG. 1, a laser scanner is designated in its entirety by the reference numeral 10. The laser scanner 10 is a an embodiment of a device according to the present invention. However, the novel device and the novel method can also be employed in other apparatuses in which a distance from an object is to be determined with the aid of a emission light beam and a reception light beam. The invention is also not restricted to the use of light beams in the narrower sense (preferred wavelengths between 300 and 1000 nm), but rather can in principle also be realized with electromagnetic waves from a larger wavelength range as long as a quasi-optical propagation is present. The expression light beam as used here therefore encompasses such electromagnetic waves as well.

The laser scanner 10 comprises a light emitter 12 and a light receiver 14, both of which are connected to an evaluation and control unit 16. In the preferred exemplary embodiment, the light emitter 12 comprises a laser diode 13 (see illustration in FIGS. 5 and 6) that is designed to emit a laser beam 18 in order to illuminate an object point at an object 20. The laser beam 18 is amplitude-modulated here with a rectangular-waveform modulation signal, as is explained in more detail below with reference to FIGS. 2 to 6. In a preferred exemplary embodiment, the emission light beam has a wavelength of approximately 790 nm.

The laser beam 18 is deflected here via a minor 22 to the object 20. The reference numeral 24 designates a reception light beam that is reflected from the object 20 and is deflected via the minor 22 to the receiver 14. The evaluation and control unit 16 is designed to determine the distance from the laser scanner 10 to the illuminated point at the object 20 from the propagation time of the emitted laser beam 18 and of the received reflected beam 24. A phase shift between the emission light beam 18 and the reception light beam 24 is determined and evaluated for this purpose.

The minor 22 is arranged here at the front end face of a cylinder 26 connected to a rotary drive 30 via a shaft 28. With the aid of the rotary drive 30, the mirror 22 can be rotated about an axis 32 of rotation. The respective rotary position of the minor 22 can be determined with the aid of an encoder 34. The output signals of the encoder 34 are likewise fed to the evaluation and control unit 16, though this is not illustrated here for reasons of clarity.

In the preferred exemplary embodiment, the axis 32 of rotation is arranged horizontally and the minor 22 is inclined at an angle of approximately 45° relative to the axis 32 of rotation. A rotation of the mirror 22 about the horizontal axis 32 therefore has the consequence that the emission light beam 18 is deflected along a vertical plane (elevation) perpendicular to the axis 32 of rotation. The emission light beam 18 forms as it were a fan with which the spatial region 36 is scanned in a vertical plane.

The laser scanner 10 here has a housing structure essentially having two housing parts 38, 40. The housing parts 38, 40 are arranged on a common baseplate 42. The emitter 12, the receiver 14 and the evaluation and control unit 16 are accommodated in the housing part 38 illustrated on the left in FIG. 1. The housing part 40 illustrated on the right in FIG. 1 accommodates the rotary drive 30 with the encoder 34 and the cylinder 26, wherein the cylinder 26 with the minor 22 projects from the housing part 40, such that the mirror 22 is arranged approximately centrally between the two housing parts 38, 40.

The baseplate 42 is arranged on a rotary drive 44 seated on a stand 46. The stand 46 is height-adjustable and has a scaling 48 in order to be able to perform a reproducible height setting. The reference numeral 50 designates a further encoder, with the aid of which the rotational position of the rotary drive 44 can be determined. The output signals of the encoder 50 are likewise fed to the evaluation and control unit 16 (not illustrated here).

The rotary drive 44 enables the laser scanner 10 to be rotated about a vertical axis 52 which together with the axis 32 of rotation defines an axial intersection point. The axial intersection point lies approximately centrally on the mirror 22 and, in preferred exemplary embodiments, defines the origin of a system of coordinates to which all the distance measuring values are referred. With the aid of the rotary drive 44, the vertical "scanning fan" produced with the aid of the rotating mirror 22 can be rotated by up to 360° in azimuth. The emission light beam 18 can thus illuminate almost any object point in the vicinity of the laser scanner 10. Shading takes place only toward the bottom by the baseplate 42, such that the viewing angle of the laser scanner 10 is limited toward the bottom.

In this exemplary embodiment, the evaluation and control unit 16 comprises a microprocessor 54 and an FPGA (field programmable gate array) 56. The FPGA 56 here generates a binary rectangular-waveform modulation signal with which the laser diode of the light emitter 12 is driven. The microprocessor 54 reads in digitized reception data from the light receiver 14 and determines the distance d between the laser scanner 10 and the object 20 on the basis of these data. In addition, the microprocessor 54 and the FPGA 56 communicate with one another, wherein the microprocessor 54 receives, inter alia, the phase information of the modulation signal for determining the propagation time.

Figure 2:
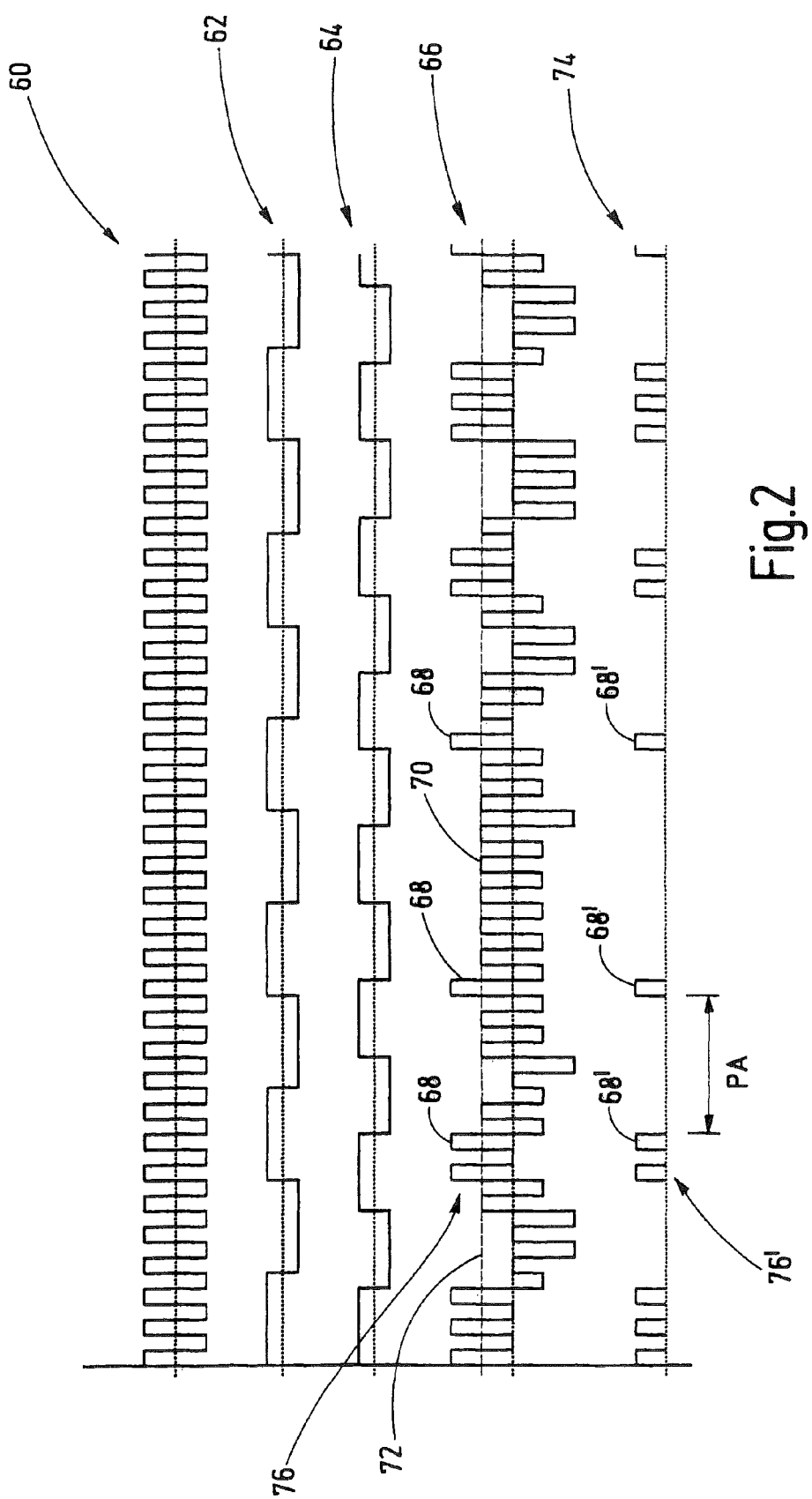
FIG. 2 shows a simplified illustration of a plurality of modulation signals which can be employed in the laser scanner in accordance with FIG. 1.

FIG. 2 shows three modulation signals 60, 62, 64, illustrated in an idealized fashion, against a time axis. The first modulation signal 60 is a rectangular-waveform modulation signal having a fundamental frequency of e.g. 125 MHz. The second modulation signal 62 is a rectangular-waveform signal having a fundamental frequency of 13 MHz, and the third modulation signal 64 is a rectangular-waveform signal having a fundamental frequency of 15 MHz. The reference numeral 66 represents a summation signal resulting from an addition of the three modulation signals 60, 62, 64. The summation signal 66 is a rectangular-waveform signal having a number of rectangular pulses 68, 70 which succeed one another with the fundamental frequency of the first modulation signal 60. The rectangular pulses 68, 70 of the summation signal 66 have different pulse heights, however, on account of the addition with the second and third modulation signals 62, 64. The summation signal 66 is therefore a combined signal which contains further signal frequencies in addition to the basic frequency of the first modulation signal 60. In particular, the summation signal 66 comprises a signal frequency corresponding to the difference between the basic frequencies of the second and third modulation signals 62, 64. This further signal frequency is manifested in the periodic pattern with which the highest rectangular pulses 68 go beyond the threshold value indicated by the reference numeral 72. Furthermore, the summation signal 66 contains a signal frequency corresponding to the average value of the fundamental frequencies of the two modulation signals 62, 64. In the preferred exemplary embodiment, the summation signal therefore contains a signal frequency of approximately 2 MHz (15 MHz–13 MHz) and a signal frequency of approximately 14 MHz (15 MHz+13 MHz/2). The summation signal 66 is therefore suitable as a modulation signal for an amplitude modulation of the emission light beam 18, wherein the relatively high signal frequency of 125 MHz supplies a fine phase for the accurate determination of the distance d, while the low signal frequency of 2 MHz supplies a coarse phase for a large unambiguity range. It goes without saying that these different signal frequencies and phase differences are evaluated correspondingly in the evaluation and control unit of the novel device, to be precise preferably in each individual measuring cycle.

In the exemplary embodiment in accordance with FIG. 2, the pulse amplitude of the first modulation signal 60 is twice as high as the pulse amplitude of the second and third modulation signals 62, 64. This has the consequence that the summation signal 66 is a quaternary signal in which the rectangular pulses 68, 70 assume one of four possible pulse values. In principle, this quaternary signal 66 can be used as a modulation signal for the emission light beam.

In a particularly preferred exemplary embodiment, however, rather than the quaternary summation signal 66, a binary modulation signal 74 is used, which results from the summation signal 66 by virtue of the fact that only the rectangular pulses 68 that extend beyond the pulse value designated by the reference numeral 72 are used. In other words, here only the "high" pulse peaks of the summation signal 66 are used, which are designated by the reference numeral 68' in FIG. 2. The lower part of the signal 66 is "cut off". As can be discerned with reference to FIG. 2, the temporal intervals PA between the rectangular pulses 68' change periodically. Furthermore, the number of rectangular pulses 68' per group 76 of rectangular pulses 68' varies. The modulation signal 74 is therefore a frequency-modulated, rectangular-waveform, binary signal whose fundamental frequency corresponds to the fundamental frequency of the first modulation signal 60 (that is to say 125 MHz here). This fundamental frequency is frequency-modulated with the beat frequency resulting from the frequency difference between the second and third modulation signals 62, 64.

Figures 3, 4:
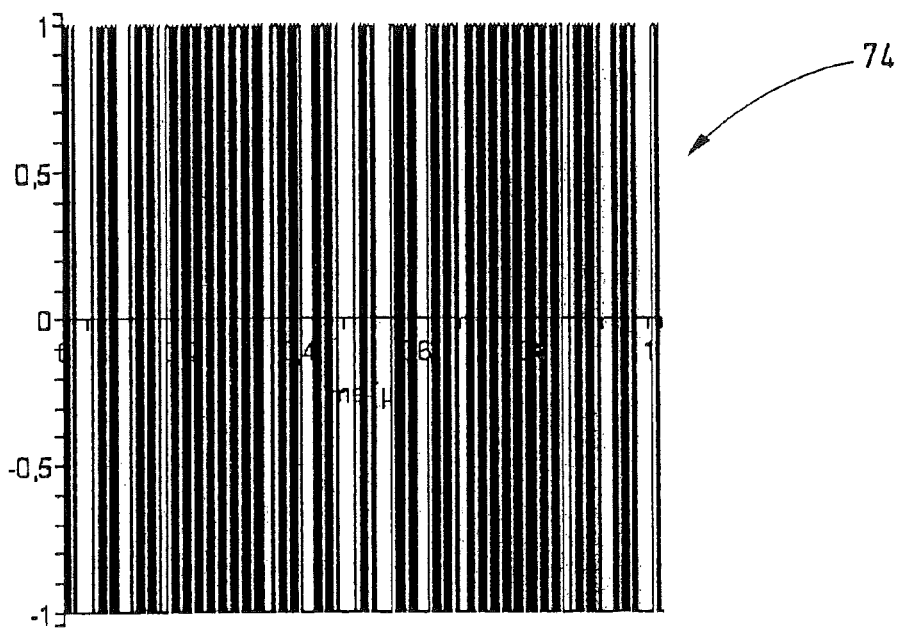
FIG. 3 shows a preferred exemplary embodiment of a modulation signal.
FIG. 4 shows the frequency spectrum of the modulation signal from FIG. 3.

FIG. 3 shows a modulation signal calculated with the aid of a digital circuit and corresponding to the modulation signal 74 from FIG. 2. FIG. 4 shows the frequency spectrum of the modulation signal from FIG. 3. A first peak, indicating a high signal component at the fundamental frequency of 125 MHz, can be discerned from the reference numeral 80. The reference numeral 82 designates further peaks lying at 375 MHz, 625 MHz, 875 MHz etc. These are odd-numbered multiples of the fundamental frequency that are typical of a rectangular-waveform signal.

Further peaks that occur on account of the combination with the second and third modulation signals 62, 64 can be discerned from the reference numerals 84, 86. The further peaks 84, 86 characterize frequency components which are likewise contained in the combined modulation signal 74 and which, in at least an embodiment of the invention, are evaluated in addition to the fundamental frequency of the first modulation signal 60 in order to determine the propagation time of the emission light beam 18 and of the reception light beam 24 and consequently the distance d. In currently preferred exemplary embodiments, only the fundamental frequencies, but not the further harmonic frequencies 82, 88 are evaluated in order to determine a phase shift between the emission light beam 18 and the reception light beam 24. In other exemplary embodiments, the harmonic frequencies, i.e. the frequencies at the peaks 82 and the frequencies 88 respectively grouped around them can also be evaluated as well. In the currently preferred exemplary embodiments, the harmonic frequencies 82, 88 are suppressed with the aid of a suitable input filter in the region of the light receiver 14. It goes without saying that such an input filter (not illustrated here) can be omitted and/or must be modified if the harmonic frequency components are likewise intended to be evaluated.

In the currently preferred exemplary embodiment, the modulation signal 74 is generated as a binary rectangular-waveform modulation signal with the aid of a digital circuit in the form of the FPGA 56. A computational specification and/or a table of values which represents the modulation signals 60, 62, 64 is stored in the FPGA 56 for this purpose. With the aid of said computational specification and/or a table of values, the FPGA 56 generates the binary pulse sequence that is fed as modulation signal 74 to the light emitter 12.

Figure 5:
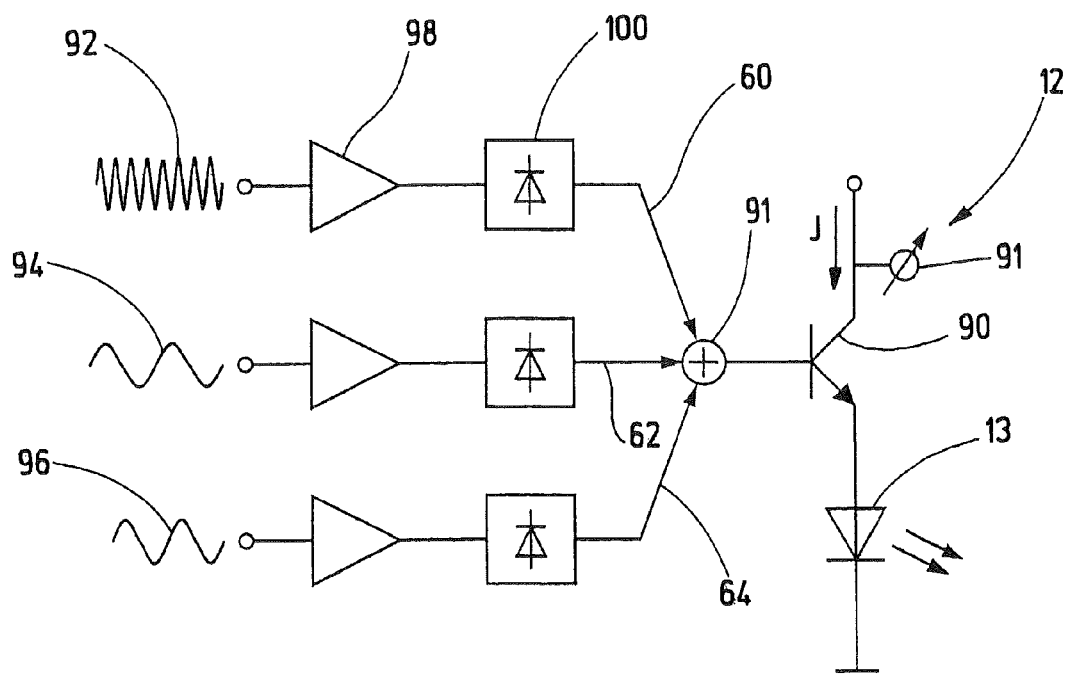
FIG. 5 shows a circuit for generating the novel modulation signal in accordance with a further exemplary embodiment.

FIG. 5 shows an alternative exemplary embodiment, in which the modulation signal for the light emitter 12 is generated in an analog manner. As can be discerned with reference to FIG. 5, the light emitter 12 comprises the laser diode 13 and a transistor 90, through which flows a control current I with which the laser diode 13 is fed. By varying the control current I through the transistor 90, an amplitude modulation of the laser light generated by the laser diode 13 is produced. The phase angle of the control current I is a measure of the phase angle of the modulation signal with which the emission light beam is modulated. Preferably, the phase angle of the control current I is measured by means of a phase detector 91 and reported as reference phase to the microprocessor 54. In another preferred exemplary embodiment, a part of the emitted light beam is branched off by means of a signal splitter and the branched-off part is measured by means of a light-sensitive monitor diode. In this way, one obtains the phase angle of the modulation signal in the emitted light beam. In a particularly preferred exemplary embodiment, a communication channel of the FPGA 56 is used for transmitting the phase information.

In the exemplary embodiment in accordance with FIG. 5, the base of the transistor 90 is fed with a summation signal corresponding e.g. to the summation signal 66 from FIG. 2. The summation signal is generated by adding a first modulation signal 60, a second modulation signal 62 and a third modulation signal 64 at a summation point 91. The modulation signals 60, 62, 64 are generated with the aid of three sinusoidal signals 92, 94, 96. Each of the three sinusoidal signals 92, 94, 96 is amplified with the aid of an amplifier 98 and subsequently "clipped" by means of a limiter 100. In this way, the sinusoidal signals 92, 94, 96 become rectangular-waveform signals such as are illustrated in an idealized fashion in FIG. 2.

Figure 6:
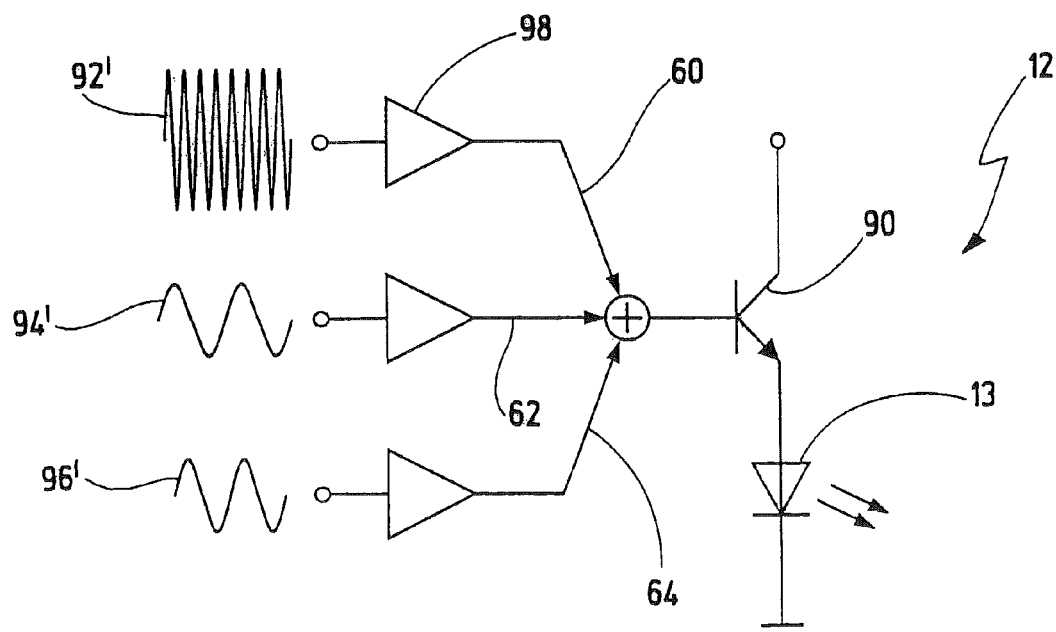
FIG. 6 shows a circuit for generating the novel modulation signal in accordance with at least another embodiment of the invention.

FIG. 6 show a further exemplary embodiment. Identical reference symbols designate the same elements as before. In this exemplary embodiment, the sinusoidal signals 92, 94, 96 are amplified with the aid of the amplifiers 98 in each case to such a great extent that the summation signal in each case drives the transistor 90 to saturation. In this exemplary embodiment, the transistor 90 itself acts as a limiter that generates the rectangular-waveform modulation signal from the sinusoidal modulation signals 92, 94, 96.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for determining a distance from an object, comprising:
   emitting an emission light beam from a light emitter;
   receiving a reception light beam at a light receiver, wherein the reception light beam arises as a result of reflection of the emission light beam at the object; and
   determining the distance on the basis of a propagation time of the emission and reception light beams;
   wherein the emission light beam is amplitude-modulated with a rectangular-waveform modulation signal;
   wherein the modulation signal has a multiplicity of rectangular pulses which occur in a multiplicity of groups; and
   wherein the groups occur at varying temporal intervals with respect to one another and have changing numbers of rectangular pulses,
   wherein the rectangular-waveform modulation signal is generated as a binary rectangular-waveform modulation signal via a digital circuit,
   wherein at least one of a computational specification of values and a table of values, which represents three modulation signals, is stored in the digital circuit, and by which the digital circuit generates the binary pulse sequence that is fed as the binary rectangular-waveform modulation signal to the light emitter.

2. The method according to claim 1, wherein the temporal intervals change periodically.

3. The method according to claim 1, wherein the number of rectangular pulses per group changes periodically.

4. The method according to claim 1, wherein the modulation signal is generated by addition of a first rectangular-waveform modulation signal having a first modulation frequency and a second rectangular-waveform modulation signal having a second modulation frequency, wherein the first modulation frequency is large relative to the second modulation frequency.

5. The method according to claim 4, wherein a third rectangular-waveform modulation signal having a third modulation frequency is furthermore added to first and second rectangular-waveform modulation signals, wherein the second and third modulation frequencies differ from one another, and wherein the first modulation frequency is also large relative to the third modulation frequency.

6. The method according to claim 5, wherein the second and third modulation signals have substantially identical pulse amplitudes.

7. The method according to claim 4, wherein the first modulation signal has a larger pulse amplitude than the second modulation signal.

8. The method according to claim 1, wherein the rectangular pulses of the modulation signal have a substantially identical pulse amplitude.

9. The method according to claim 1, wherein the rectangular-waveform modulation signal is generated as a binary rectangular-waveform modulation signal with the aid of a digital circuit.

10. The method according to any of claim 1, characterized in that the rectangular-waveform modulation signal is generated from at least two sinusoidal signals having a different frequency, wherein the sinusoidal signals are in each case amplified and amplitude-limited.

11. The method according to claim 1, wherein the propagation time of the emission and reception light beams is determined on the basis of a phase difference of the modulation signal in the emission light beam and in the reception light beam, wherein there is measurement of the phase angle of the modulation signal in the emission light beam as to the light emitter.

12. A device for determining a distance from an object, comprising:
a light emitter for emitting an emission light beam;
a light receiver for receiving a reception light beam, wherein the reception light beam arises as a result of reflection of the emission light beam at the object; and
an evaluation unit for determining the distance of the object on the basis of a propagation time of the emission and reception light beams;
wherein the emission light beam is amplitude-modulated with a rectangular-waveform modulation signal; and
wherein the modulation signal has a multiplicity of rectangular pulses which occur in a multiplicity of groups;
wherein the groups occur at varying temporal intervals with respect to one another and have different numbers of rectangular pulses
wherein the evaluation unit includes a digital circuit generating the rectangular-waveform modulation signal as a binary rectangular-waveform modulation signal,
wherein at least one of a computational specification of values and table of values, which represents three modulation signals, is stored in the digital circuit, and by which the digital circuit generates the binary pulse sequence that is fed as the binary rectangular-waveform modulation signal to the light emitter.

13. The device according to claim 12, wherein the light emitter include a laser diode, and wherein the binary rectangular-waveform modulation signal drives the laser diode of the light emitter.

14. The device according to claim 12, wherein the digital circuit for generating the binary rectangular-waveform modulation signal is a field programmable gate array (FPGA).

15. The device according to claim 12, wherein the evaluation unit includes a microprocessor that reads digitized reception data from the light receiver and determines a distance between a laser scanner and the object on the basis of the digitized reception data.

16. The device according to claim 15, wherein the microprocessor is communicatively coupled to the digital circuit for generating the binary rectangular waveform modulation signal, and wherein the microprocessor receives phase information for the binary rectangular-waveform modulation signal for determining propagation time.

* * * * *